United States Patent Office 3,708,436
Patented Jan. 2, 1973

3,708,436
DETERGENT BUILDERS
Ralph B. Thompson, Oak Brook, Peter G. Pappas, Downers Grove, and Joseph M. Sandri, Flossmoor, Ill., assignors to Nalco Chemical Company, Chicago, Ill.
No Drawing. Filed Dec. 12, 1969, Ser. No. 884,739
Int. Cl. C11d
U.S. Cl. 252—527
6 Claims

ABSTRACT OF THE DISCLOSURE

A synergistic mixture of polymeric maleic anhydride (PMA) with sodium nitrilotriacetate (NTA) or sodium tripolyphosphate (STP) is employed as a detergent builder with or without purification of the PMA. Maleic anhydride also has a synergistic effect with purified PMA. NTA has a synergistic effect with maleic anhydride-methacrylate copolymers, vinyl acetate-maleic anhydride copolymers, and with styrene-maleic anhydride copolymers.

---

It is known in the art that some materials are capable of improving the detergent levels of soaps and synthetic detergents. These cleaning boosters are called "builders." "Builders" permit the attainment of superior cleaning performance and are especially useful in detergents for heavy duty cleaning, for example, as in laundry operations.

Many different types of detergent compositions have been prepared with various types of builders. One of the most common types of builders which is frequently used as a standard is sodium tripolyphosphate (STP). Another builder is an organic salt sodium nitrilotriacetate (NTA). It has heretofore been suggested that polymerized maleic anhydride, which has subsequently been converted to sodium polymaleate by treatment with aqueous sodium hydroxide, can be employed as a builder.

One of the objects of the present invention is to provide a new and improved builder of enhanced effectiveness.

Another object of the invention is to provide a new and improved builder in the form of a synergistic composition.

Still a further object of the invention is to provide new and improved detergent compositions. Other objects will appear hereinafter.

In accordance with the invention it has been found that polymeric maleic anhydride (PMA) when employed in combination with sodium nitrilotriacetate (NTA) or sodium tripolyphosphate (STP) has a synergistic effect and provides a builder of improved effectiveness as compared with the components of the builder composition when employed alone. It has also been found that purified polymeric maleic anhydride (PMA) shows a synergistic effect with maleic anhydride when employed as a builder.

PMA is preferably prepared by homopolymerization of molten maleic anhydride with benzoyl peroxide as a catalyst. The homopolymerization reaction is usually about 35% to 60% complete. However, the whole reaction mixture can be used as one of the components of the detergent builder and as separated from the reaction vessel. Alternatively, the crude PMA can be purified to remove excess maleic anhydride, for example, by washing with toluene, and the purified PMA shows a synergistic effect when employed as a detergent builder in combination with NTA, STP or maleic anhydride.

The best mode contemplated for the purpose of the invention is the use of a 1:1 weight ratio of PMA to NTA or STP or maleic anhydride. A mixture of maleic anhydride and purified PMA can also be used in combination with NTA or STP. In general, the weight ratio of PMA, either crude or purified, to NTA or STP will be within the range of 1:4 to 4:1. Where purified maleic anhydride is employed in conjunction with maleic anhydride, the weight ratio will also be within the range of 1:4 to 4:1.

In preparing the PMA, other peroxide catalysts and other methods of preparation can be employed. It will be recognized that the preparation of PMA by the homopolymerization of molten maleic anhydride in the presence of a peroxide catalyst and the use of the crude product as such in combination with NTA or STP has economic and commercial advantages.

The following examples in which the quantities are by weight unless otherwise indicated are given to illustrate the best mode contemplated for the practice of the invention.

EXAMPLE I

Preparation of PMA

Into a one liter resin flask equipped with a condenser, dropping funnel, stirrer, thermometer, and nitrogen outlet were added 98 parts maleic anhydride and 20 parts toluene. The mixture was heated to 125° C. while purging with nitrogen. While maintaining the temperature at 125±5° C., 4 parts benzoyl peroxide dissolved in 30 parts toluene were added as continuously and as evenly as possible over a period of 4 hours. The total polymerization time was 4.5 hours.

The product was removed from the flask, dried at 40° C. to 50° C. under a reduced pressure of 200-300 mm. of mercury to obtain essentially a quantitative yield of crude product.

EXAMPLE II

The procedure was the same as in Example I except that the benzoyl peroxide was added in increments of 0.25 part over 15 minutes.

EXAMPLE III

The procedure was the same as in Example I except that PMA was purified by washing with toluene to remove unreacted maleic anhydride.

EXAMPLE IV

The invention was evaluated by using a test known as the Terg-O-Tometer test. The general operating conditions of the test were as follows:

Washing cycle: fifteen minutes.
Rinsing cycle: Three minutes.
Oscillations: Ninety per minute for washing and rinsing.
Water bath: Twenty two liters of water, 120° F.
Hard water for washing: One liter per steel beaker, 125° F.
Fabrics: Two pieces of soiled cloth, 4" x 6", per steel beaker plus two pieces of clean cotton "400," 4" x 6".
Reflectance:* Using a green filter in the photocell measure the reflectance of each swatch eight times before washing and eight times after washing.
Detergent formulations: One and a half grams (1.5 g.) per beaker.

The washing procedure was as follows:
Having filled the water bath with 22 liters of water, the heater and stirrer were turned on. The heater was

---

*The reflectometer was standardized against a known standard whose reflectance was reported 78.5.

adjusted to maintain the water bath at 120° F. When the water bath had reached equilibrium at the desired temperature, one liter of hot water, 125° F., and of the desired hardness, as $CaCO_3$ (300 p.p.m., 50 p.p.m., 180 p.p.m.), was placed in each of the four steel beakers. One and a half grams (1.5 g.) of detergent formulation was added per steel beaker along with two pieces of soiled cloth (same type) and two pieces of clean cotton "400" whose reflectance had been measured. The pH of the solution was adjusted to pH 10. The agitators were turned on. The number of oscillations, 90/minute, was adjusted manually. Washing was done for fifteen minutes. The fabrics were removed, squeezed by hand, and set aside for rinsing.

The following rinsing procedure was used.

The washed fabrics were removed from the steel beakers and the steel beakers and agitators were washed to free them from the washing composition. One liter of hot water at a temperature of 125° F. and of the same hardness as that used for washing was added per steel beaker. The washed fabrics were then placed in the beakers and agitated for 3 minutes. They were then removed, squeezed and air dried, or dried in a dryer.

When the fabrics were dry their reflectance was measured on a reflectometer eight times per swatch. The reflectance measurements were then compared with controls.

The detergent composition used in making the evaluation test consisted of 20% surfactant, 34% sodium sulfate ($Na_2SO_4$), 6% sodium silicate (ratio of $Na_2O:SiO_2$ of 1:2.5), together with the varying amounts of builder ranging from 10% to 40%, the remainder being water. The surfactant used was a sodium linear alkylate sulfonate of the anionic type known as Ultrawet K. This is a biodegradable surfactant. The fabrics tested were a pre-conditioned "dirty" cloth having a reflectance of 15 (F. D. Snell cloth) and a cotton cloth known as cotton "400." With no builder added to the detergent composition, the F. D. Snell cloth after washing gave a reflectance of 25. With 10% of the PMA reaction mixture of Example I added to the detergent composition as a builder, the reflectance was 28. With 10% of a builder consisting of equal parts of NTA and PMA, the reflectance was 32. With 20% of a builder consisting of equal parts of NTA and PMA, the reflectance was 36. With 30% of a builder consisting of equal parts of NTA and PMA, the reflectance was 37, and with 40% of a builder consisting of equal parts of NTA and PMA, the reflectance was 40. With 40% NTA alone as a builder the reflectance was 37.

With 40% of STP alone as the builder, the reflectance was 35. With 20% of a builder consisting of equal parts by weight of PMA and STP, the reflectance was 39 and with 40% of a builder consisting of equal parts by weight of PMA and STP, the reflectance was 40.

At a concentration of 20% builder, the use of PMA reaction mixture alone gave a reflectance reading of 32.5 and the combined use of equal parts by weight of NTA and PMA gave a reflectance reading of 36. Purified PMA or PMA mixed with pure maleic anhydride in a weight ratio of 1:1 gave almost the same results as the reaction mixture from the homopolymerization mixture. Pure sodium maleate was ineffective as a builder. PMA showed a synergistic effect with NTA and STP but not with a vinyl acetate-maleic anhydride copolymer or a styrene-maleic anhydride copolymer.

In the foregoing example, the weight ratio of builder to surfactant can vary within the range of 1:3 to 10:1.

The quantity of sodium sulfate can be increased or decreased inversely with an increase or decrease in the amount of builder. For example, if the amount of builder is reduced from 40% to 30% the amount of sodium sulfate can be increased to 44%.

The synergistic builder compositions of the invention are especially useful when employed with anionic synthetic non-soap detergents of the general formula $RSO_3Na$ where R is a straight chain or branched chain aliphatic hydrocarbon radical containing 8 to 22 carbon atoms, or mixtures of such detergents. For example, R can be octyl, nonyl, decyl, undecyl, dodecyl, tridecyl, tetradecyl, pentadecyl, hexadecyl, octadecyl, undecenyl, octadecenyl, tripropylene, tetrapropylene, or homologous radicals containing 8 to 22 carbon atoms.

The synthetic builder compositions of this invention can also be employed with other surfactants, especially those obtained by sulfating the higher alcohols ($C_8$–$C_{18}$ carbon atoms) produced by reducing the glycerides of tallow or coconut oil; sodium or potassium alkyl benzene sulfonates, in which the alkyl group contains from about 9 to about 15 carbon atoms, including those of the types described in U.S. Pats. 2,220,099 and 2,477,383 (the alkyl radical can be a straight or branched aliphatic chain); sodium alkyl glyceryl ether sulfonates, especially those ethers of the higher alcohols derived from tallow and coconut oil; sodium coconut oil fatty acid monoglyceride sulfates and sulfonates; sodium or potassium salts of sulfuric acid esters of the reaction product of one mole of a higher fatty alcohol (e.g., tallow or coconut oil alcohols) and about 1 to 6 moles of ethylene oxide; sodium or potassium salts of alkyl phenol ethylene oxide ether sulfate with about 1 to about 10 units of ethylene oxide per molecule and in which the alkyl radicals contain from 8 to about 12 carbon atoms; the reaction product of fatty acids esterified with isethionic acid and neutralized with sodium hydroxide where, for example, the fatty acids are derived from coconut oil; sodium or potassium salts of fatty acid amide of a methyl tauride in which the fatty acids, for example, are derived from coconut oil; sodium and potassium salt of $SO_3$-sulfonated $C_{10-24}$ α-oelfins and others known in the art, a number being specifically set forth in U.S. Pat. Nos. 2,486,921, 2,486,922 and 2,396,278.

The synthetic builder compositions of this invention can also be employed with non-ionic synthetic detergents. Nonionic synthetic detergents can be broadly defined as compounds produced by the condensation of alkylene oxide groups (hydrophilic in nature) with an organic hydrophobic compound, which may be aliphatic or alkyl aromatic in nature. The length of the hydrophilic or polyoxyalkylene radical which is condensed with any particular hydrophobic group can be readily adjusted to yield to a water soluble compound having the desired degree of balance between hydrophilic and hydrophobic elements.

As an example, a class of nonionic synthetic detergents is made available on the market under the trade name of "Pluronic." These compounds are formed by condensing ethylene oxide with a hydrophobic base formed by the condensation of propylene oxide with propylene glycol. The hydrophobic portion of the molecule which, of course, exhibits water insolubility, has a molecular weight of from about 1500 to 1800. The addition of polyoxyethylene radicals to this hydrophobic portion tends to increase the water solubility of the molecule as a whole and the liquid character of the product is retained up to the point where polyoxyethylene content is about 50% of the total weight of the condensation product.

Other suitable nonionic synthetic detergents include:

(1) The polyethylene oxide condensates of alkali phenols, e.g., the condensation products of alkyl phenols, having an alkyl group containing from about 6 to 12 carbon atoms in either a straight chain or branched chain configuration, with ethylene oxide, the said ethylene oxide being present in amounts equal to 5 to 25 moles of ethylene oxide per mole of alkyl phenol. The alkyl substituent in such compounds may be derived from polymerized propylene, diisobutylene, octene, or nonene, for example.

(2) Those nonionic synthetic detergents derived from the condensation of ethylene oxide with the product resulting from the reaction of propylene oxide and ethylene diamine. For example, compounds containing from about 40% to about 80% polyoxyethylene by weight and having a molecular weight of from about 5000 to about 11,000 resulting from the reaction of ethylene oxide groups with a hydrophobic base constituted of the reaction product of ethylene diamine and excess propylene oxide, said base having a molecular weight of the order of 2500 to 3000, are satisfactory.

(3) The condensation product of aliphatic alcohols having from 8 to 22 carbon atoms, in either straight chain or branched chain configuration, with ethylene oxide, e.g., a coconut alcohol-ethylene oxide condensate having from 5 to 30 moles of ethylene oxide per mole of coconut alcohol, the coconut alcohol fraction having from 10 to 14 carbon atoms.

(4) Long chain tertiary amine oxides corresponding to the following general formula, $R_1R_2R_3 \rightarrow O$, wherein $R_1$ is an alkyl radical of from about 8 to about 18 carbon atoms, and $R_2$ and $R_3$ are each methyl or ethyl radicals. The arrow in the formula is a conventional representation of a semi-polar bond. Examples of amine oxides suitable for use in this invention include dimethyldodecylamine oxide, dimethyloctylamine oxide, dimethyldecylamine oxide, dimethyltetradecylamine oxide, dimethylhexadecylamine oxide.

(5) Long chain tertiary phosphine oxides corresponding to the following general formula $RR'R''P \rightarrow O$ wherein R is an alkyl, alkenyl or monohydroxyalkyl radical ranging from 10 to 18 carbon atoms in chain length and $R'$ and $R''$ are each alkyl or monohydroxyalkyl groups containing from 1 to 3 carbon atoms. The arrow in the formula is a conventional representation of a semi-polar bond. Examples of suitable phosphine oxides are: dodecyldimethylphosphine oxide, tetradecyldimethylphosphine oxide, tetradecylmethylethylphosphine oxide, cetyldimethylphosphine oxide, stearyldimethylphosphine oxide, cetylethylpropylphosphine oxide, dodecyldiethylphosphine oxide, tetradecyldiethylphosphine oxide, dodecyldipropylphosphine oxide, dodecyldi(hydroxymethyl)phosphine oxide, dodecyldi(2-hydroxyethyl)phosphine oxide, tetradecylmethyl-2-hydroxypropylphosphine oxide, oleyldimethylphosphine oxide, and 2-hydroxydodecyldimethylphosphine oxide.

The synthetic builder compositions of the invention can also be employed with ampholytic synthetic detergents. Ampholytic synthetic detergents can be broadly described as derivatives of aliphatic secondary and tertiary amines, in which the aliphatic radical may be straight chain or branched and wherein one of the aliphatic substitutents contains from about 8 to 18 carbon atoms and one contains an anionic water solubilizing group, e.g., carboxy, sulfo, sulfato, phosphato, or phosphono. Examples of compounds falling within this definition are sodium-3-dodecylaminopropionate and sodium-3-dodecylaminopropane sulfonate.

The synthetic builder compositions of this invention can also be employed with zwitterionic synthetic detergents. Zwitterionic synthetic detergents can be broadly described as derivatives of aliphatic quaternary ammonium, phosphonium, and sulfonium compounds, in which the aliphatic radical may be straight chain or branched, and wherein one of the aliphatic substituents contains from about 8 to 18 carbon atoms and one contains an anionic water solubilizing group, e.g., carboxy, sulfo, sulfato, phosphato, or phosphono. Examples of compounds falling within this definition are 3-(N,N-dimethyl-N-hexadecylammonio)propane-1-sulfonate and 3-(N,N-dimethyl-N-hexadecylammonio)-2-hydroxy propane-1-sulfonate which are especially preferred for their excellent cool water detergency characteristics.

The soap and non-soap anionic, nonionic, ampholytic and zwitterionic detergent surfactants mentioned above can be used singly or in combination in the practice of the present invention. The above examples are merely specific illustrations of the numerous detergents which can find application within the scope of this invention. Other surfactants within the prescribed classes can also be used.

The foregoing detergent compounds can be made into any of the several commercially desirable composition forms, for example, granular, flake, liquid and tablet forms.

The specific action of the builder mixtures of the present invention will vary to some extent depending upon the ratio of active detergent to builder mixture in any given detergent composition. Moreover, there will be considerable variation in the strengths of the washing solutions employed by different housewives, i.e., some housewives may tend to use less or more of the detergent compositions than will others. Moreover, there will be variations in temperature and in soil loads as between washing operation. Further, the degree of hardness of the water used to make up the washing solutions will also bring about apparent differences in the cleaning power and whiteness maintenance results. Finally, different fabrics will respond in somewhat different ways to different detergent compositions. The best type of detergent composition for household use is a composition which accomplishes an excellent cleaning and whiteness maintenance effect under the most diverse cleaning conditions. The built detergent compositions are especially valuable in this respect.

In the use of the detergent compositions containing the builder it is desirable to provide a pH within the range of 9 to 12. Alkaline ingredients, such as sodium silicate, can be used to provide the optimum pH level. Ordinarily not more than 6% by weight sodium silicate is required but higher concentrations can be used.

In general, detergent compositions made with synergistic builder compositions of the present invention can contain from 2 to 40 parts by weight total surfactant, 0 to 50 parts by weight sodium sulfate, 10 to 40 parts by weight of builder composition, and a sufficient amount of alkaline substance, preferably sodium silicate, to provide a pH of 9 to 12 when the composition is mixed with water.

The results obtained by reflectance tests clearly show that the PMA has a synergistic effect with either NTA or STP. This synergistic effect occurs with crude PMA containing unreacted maleic anhydride and also when a combination of purified PMA and maleic anhydride is employed.

NTA has a synergistic effect with maleic anhydride-methylmethacrylate copolymers, with vinyl acetate-maleic anhydride copolymers, and with styrene-maleic anhydride copolymers. These copolymers are formed by reacting maleic anhydride with either methylmethacrylate, vinyl acetate or styrene in molar ratios of 1:4 to 4:1, preferably 1:1. The weight ratio of sodium nitrilotriacetate to the copolymer in each case is within the range of 1:4 to 4:1 and is preferably 1:1.

The invention is hereby claimed as follows:

1. A builder composition for detergents comprising water soluble polymeric maleic anhydride and sodium nitrilotriacetate in synergistic proportions, wherein the weight ratio of said polymeric maleic anhydride to said sodium nitrilotriacetate ranges from 1:4 to 4:1.

2. A builder composition as claimed in claim 1 wherein said weight ratio is approximately 1:1.

3. A detergent composition consisting essentially of 2 to 40 parts by weight of a water soluble detergent and 10 to 40 parts by weight of a builder composition as claimed in claim 1.

4. A detergent composition consisting essentially of 2–40 parts by weight of a water soluble detergent and 10–40 parts by weight of a builder composition as claimed in claim 2.

5. A composition as claimed in claim 3 in which the detergent is a linear anionic synthetic non-soap detergent.

6. A composition as claimed in claim 5 in which the said detergent has the general formula $RSO_3Na$ where R is a straight chain or branched chain hydrocarbon radical containing 8 to 22 carbon atoms or a mixture of such radicals.

References Cited

UNITED STATES PATENTS

| | | | |
|---|---|---|---|
| 3,308,067 | 3/1967 | Diehl | 252—161 |
| 3,332,880 | 7/1967 | Kessler et al. | 252—161 |
| 3,385,834 | 5/1968 | Nerijan | 252—89 X |
| 3,509,059 | 4/1970 | Renoid | 252—89 X |

OTHER REFERENCES

Reports—Science, vol. 171, p. 1008, Mar. 12, 1971.

MAYER WEINBLATT, Primary Examiner

U.S. Cl. X.R.

252—89, 117, 541, 554

UNITED STATES PATENT OFFICE
CERTIFICATE OF CORRECTION

Patent No. U.S. 3,708,436          Dated January 2, 1973

Inventor(s) Ralph B. Thompson, et al

It is certified that error appears in the above-identified patent and that said Letters Patent are hereby corrected as shown below:

Column 4, line 64, "alkali" should read "alkyl."

Signed and sealed this 29th day of May 1973.

(SEAL)
Attest:

EDWARD M. FLETCHER, JR.          ROBERT GOTTSCHALK
Attesting Officer                Commissioner of Patents